Sept. 1, 1964 — W. B. RETALLICK — 3,146,795
ROTARY VALVE
Filed Sept. 10, 1963

INVENTOR.
WILLIAM B. RETALLICK

United States Patent Office 3,146,795
Patented Sept. 1, 1964

3,146,795
ROTARY VALVE
William B. Retallick, 128 Williams Ave., Canonsburg, Pa.
Filed Sept. 10, 1963, Ser. No. 307,866
4 Claims. (Cl. 137—625.17)

This invention relates to a rotary valve for controlling the flow of a fluid.

Such valves are used to split an incoming stream into a pair of outlet streams or to control the time and direction of flow of a fluid. The disadvantage of the valves already available is that the split or the time cannot be varied without making mechanical changes in the valve. In short, these valves are not adjustable.

An object of this invention is to provide a rotary valve for splitting an incoming stream into a pair of outlet streams whereby the split can be varied while the flow continues.

Another object is to provide a valve for controlling the time and direction of flow of a fluid whereby the time can be varied while the flow continues.

In accordance with this invention, my rotary valve comprises a slidable rotor within the bore of a housing. The rotor is cut away from the housing along a noncircular edge which overlaps the outlet ports periodically upon rotation of the rotor. The duration of the overlap can be varied by sliding the rotor to different positions along the bore, to vary the split or the time of flow in either direction.

A fuller understanding of this invention will be had from the following description together with the drawings.

Figure 1:
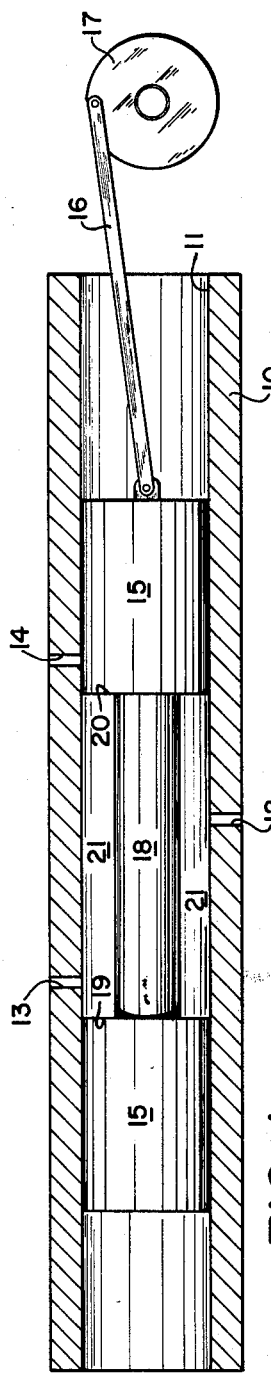
FIGURE 1 is a partial section along the axis of a reciprocating valve for controlling the split of an incoming stream into two outlet streams. It is the forerunner of the rotary valve in FIGURE 2, and is included here to show the advantage of the rotary valve for accomplishing the same purpose.

FIGURE 1 shows a housing 10 and a reciprocating piston 15. The housing has a bore 11, an inlet port 12, and outlet ports 13 and 14. The piston 15 is made to reciprocate by piston rod 16 which is attached to the rotating wheel 17. The axis of wheel 17 is movable toward or away from the housing so that the mean position of piston 15 within bore 11 is variable. The central portion 18 of piston 15 is cut away from the housing along the two circular edges 19 and 20, whereby an annular space 21 is confined within bore 11 between these edges. The edges are separated by the distance between the outlet ports 13 and 14, so that one outlet is being closed just as the other is being opened. For every revolution of the wheel 17 each outlet port is opened and closed once. The inlet port 12 is near the midpoint of annular space 21, where neither edge overlaps it. The fraction of a cycle during which either port is open, and hence the split between the streams leaving through ports 13 and 14, can be varied by changing the position of the axis of wheel 17. The mean position of the piston can be moved far enough to the left to keep port 14 closed throughout the entire cycle so that all of the flow leaves through port 13. Likewise port 13 can be kept closed throughout the cycle, and any intermediate split can be obtained by suitably adjusting the mean position of the piston.

The periodic opening and closing of the outlet ports is caused by the edges 19 and 20 overlapping them upon reciprocation of the piston. The same could be accomplished by making these edges noncircular, while rotating the piston instead of reciprocating it. Also, the split between the outlet streams could be varied by changing the mean position of the piston, which leads to the rotary valve described next.

Figure 2:
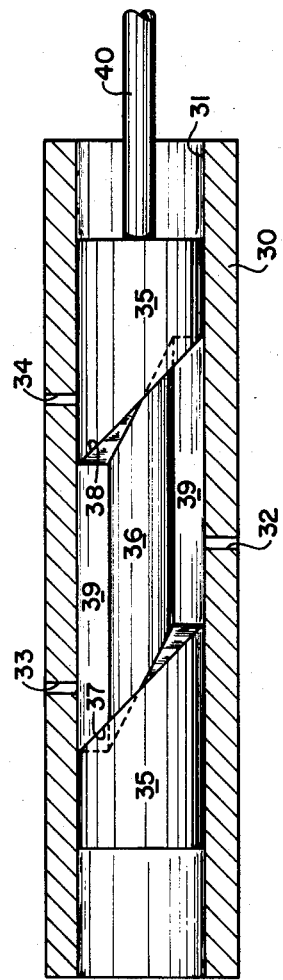
FIGURE 2 is a partial section along the axis of a rotary splitter valve.

FIGURE 2 shows the preferred embodiment of my valve for splitting an incoming stream into two outlet streams. It comprises a housing 30 and a slidable rotor 35. The housing 30 has a bore 31, an inlet port 32, and outlet ports 33 and 34. The central portion 36 of rotor 35 is cut away from housing 30 along the noncircular edges 37 and 38 whereby an annular space 39 is confined within bore 31 between these edges. In this preferred embodiment the edges 37 and 38 are parallel and are separated by the distance between the outlet ports 33 and 34, so that one outlet port is being closed just as the other is being opened. When rotor 35 is in the position shown each outlet port is opened and closed once during a revolution of the rotor. The inlet port 32 is near the midpoint of annular space 39, where neither edge overlaps it. By suitably positioning the rotor along bore 31 either outlet port can be kept open during any fraction of a revolution. By moving the rotor to an extreme left or right hand position, either outlet port can be kept closed throughout the revolution. Both rotary and sliding motion are imparted to the rotor by any suitable means such as shaft 40.

The noncircular edges 37 and 38 can have any desired shape. They could be formed, for example, by a pair of sine waves traced around the circumference of the rotor. In that case more than one pair of outlet ports could be used, and the number of pairs could be as many as the number of valleys in the wave. In that case, however, all of the outlet ports at either edge must join a common exterior duct so that only one common duct is open to the flow at any instant. FIGURE 2 merely shows the simplest rotor with one valley and one pair of outlet ports. Any number of inlet ports could be used because they are never closed.

This valve is simpler than its reciprocating forerunner because it substitutes rotary motion for reciprocating motion. This is particularly advantageous in large valves, or whenever the cycle must be repeated rapidly.

One application of this valve is for splitting out a sample from a main stream. Another application is to reverse the flow and use it to blend two streams together in some definite ratio.

Figure 3:
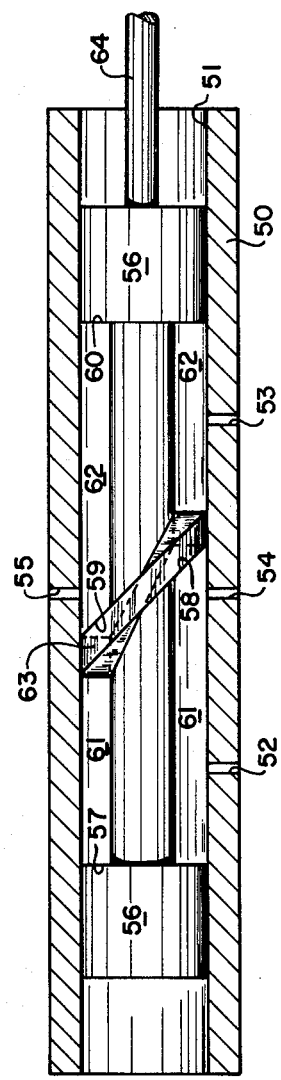
FIGURE 3 is a partial section along the axis of a valve for controlling the time and direction of flow of a fluid.

FIGURE 3 shows a valve for controlling the time and direction of flow of a fluid. It comprises a housing 50 and a slidable rotor 56. The housing has a bore 51, a pressure port 53, and any number of outlet ports such as 54 and 55. The rotor 56 is cut away from the bore along edges 57, 58, 59, and 60 whereby annular spaces 61 and 62 are confined within bore 51 between edges 57 and 58 and between edges 59 and 60. Edges 57 and 60 never overlap any of the ports so their shape is immaterial. Edges 58 and 59 are noncircular and parallel. They define the noncircular partition 63 which separates annular spaces 61 and 62. When rotor 56 is in the position illustrated, both edges of partition 63 overlap each of the outlet ports once during a revolution of the rotor so that each outlet port communicates with the pressure port and the suction port once during a revolution. By suitably positioning the rotor along bore 51 the outlet ports can be made to remain on pressure or suction during any fraction of a revolution. By moving the rotor to an extreme left or right hand position the outlet ports can be kept on pressure or suction throughout the revolution. Both rotary and sliding motion are imparted to the rotor by any suitable means such as shaft 64.

Any number of pressure and exhaust ports can be used so long as they communicate with common exterior ducts.

The outlet ports need not lie along a common circle and each can have a separate exterior duct.

An application of this valve is to drive a number of pistons, as in a sequential punching press.

I have explained the principle, preferred construction and mode of operation of my invention and have illustrated and described what I now consider to represent its best embodiment. However, the invention may be practiced otherwise than as specifically illustrated and described, within the scope of the claims.

I claim:

1. A rotary valve comprising a slidable rotor within the bore of a housing
   (a) said rotor being cut away from said housing along two edges whereby an annular space is confined within said bore between said edges,
   (b) said edges being spaced apart and also noncircular, whereby each of said edges periodically overlaps a separate length of the wall of the bore upon rotation of the rotor,
   (c) said housing having at least one inlet port adjacent the midpoint of said annular space,
   (d) said housing having at least one outlet port lying within each of said overlapped lengths of said bore wall whereby said outlet ports are periodically overlapped by said noncircular edges,
   (e) said rotor being axially slidable whereby the duration of overlapping can be varied, 2. A valve as in claim 1 wherein said outlet ports are in spaced relationship to said noncircular edges whereby the outlet ports at one edge are being closed just as the ports at the other edge are being opened.

3. A rotary valve comprising a slidable rotor within the bore of a housing
   (a) said rotor having an endless groove cut around its circumference,
   (b) said groove having edges which are noncircular and spaced apart, whereby each of said edges periodically overlaps a separate length of the wall of the bore upon rotation of the rotor,
   (c) said housing having at least one inlet port adjacent the midpoint of said groove,
   (d) said housing having at least one outlet port lying within each of said overlapped lengths of said bore wall whereby said outlet ports are periodically overlapped by said noncircular edges,
   (e) said rotor being axially slidable whereby the duration of overlapping can be varied.

4. A valve as in claim 3 wherein said outlet ports are in spaced relationship to said noncircular edges whereby the outlet ports at one edge are being closed just as the ports at the other edge are being opened.

References Cited in the file of this patent
UNITED STATES PATENTS

| | | |
|---|---|---|
| 375,508 | Rodman | Dec. 27, 1887 |
| 2,141,428 | Carroll | Dec. 27, 1938 |
| 2,397,594 | Buchanan | Apr. 2, 1946 |
| 2,818,881 | Bonner et al. | Jan. 7, 1958 |
| 2,926,697 | Baker et al. | Mar. 1, 1960 |